(12) United States Patent
Demonie et al.

(10) Patent No.: US 9,943,795 B2
(45) Date of Patent: Apr. 17, 2018

(54) ROTARY DUST SCREEN

(71) Applicant: CNH Industrial America LLC, New Holland, PA (US)

(72) Inventors: Lode A. Demonie, Staden (BE); Jolan Heyns, Oostkamp (BE); Steven Titeca, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 56 days.

(21) Appl. No.: 15/061,147

(22) Filed: Mar. 4, 2016

(65) Prior Publication Data
US 2016/0256811 A1 Sep. 8, 2016

(30) Foreign Application Priority Data
Mar. 4, 2015 (BE) .................... 2015/5114

(51) Int. Cl.
*B01D 46/10* (2006.01)
*F01P 11/12* (2006.01)
*A01D 41/12* (2006.01)
*B01D 46/00* (2006.01)
*A01B 76/00* (2006.01)
(Continued)

(52) U.S. Cl.
CPC .......... *B01D 46/0056* (2013.01); *A01B 76/00* (2013.01); *B01D 46/0065* (2013.01); *B01D 46/10* (2013.01); *F01P 1/06* (2013.01); *F01P 11/06* (2013.01); *F01P 11/12* (2013.01); *A01D 41/1252* (2013.01); *B01D 2259/4566* (2013.01); *B01D 2273/14* (2013.01); *F01P 2011/061* (2013.01)

(58) Field of Classification Search
CPC ...... B01D 46/10; B01D 46/0065; F01P 11/12; A01D 41/1252; A01D 41/12; Y10S 180/90
USPC ........... 55/296, 282, 295; 15/33, 81, 250.29, 15/250.3, 250.32, 256.5, 256.53; 180/90
See application file for complete search history.

(56) References Cited

U.S. PATENT DOCUMENTS 3,475,883 A    11/1969   Sillivan
4,906,262 A *   3/1990   Nelson ..................... F01P 11/12
                                                                   55/290
(Continued)

FOREIGN PATENT DOCUMENTS

DE    19546321 A1   6/1996
DE    19901651 C1   5/2000
(Continued)

*Primary Examiner* — Frank Lawrence, Jr.
*Assistant Examiner* — Minh-Chau Pham
(74) *Attorney, Agent, or Firm* — Peter K. Zacharias; Patrick M. Sheldrake

(57) ABSTRACT

A rotary dust screen for a cooling unit of an agricultural vehicle includes a frame having a ring shape, wherein a dust screen is mounted in the frame and wherein the frame includes a seal extending along the ring and comprising a lip adapted to abut, when the rotary dust screen is mounted on the cooling unit, against a housing of the cooling unit to prevent contaminants from entering the cooling unit at an edge of the dust screen, wherein the rotary dust screen further has a driving belt adapted to be driven by a rotary actuator to rotate the dust screen, wherein the driving belt engages with the rotary dust screen at an outer surface of the seal.

13 Claims, 3 Drawing Sheets

(51) Int. Cl.
*F01P 1/06* (2006.01)
*F01P 11/06* (2006.01)

(56) References Cited

U.S. PATENT DOCUMENTS

| | | | | |
|---|---|---|---|---|
| 5,183,487 | A | * | 2/1993 | Lodico .................... F01P 11/12 55/289 |
| 5,944,603 | A | | 8/1999 | Guinn et al. |
| 6,248,145 | B1 | | 6/2001 | Radke |
| 8,974,564 | B2 | * | 3/2015 | Hershbarger ...... A01D 41/1252 15/250.29 |
| 2002/0088208 | A1 | * | 7/2002 | Lukac .................. A01B 51/026 55/289 |
| 2006/0283157 | A1 | * | 12/2006 | Keys, II ............. A01D 41/1252 55/290 |
| 2009/0211208 | A1 | * | 8/2009 | Johnson ............ B01D 46/0065 55/291 |

FOREIGN PATENT DOCUMENTS

| | | | |
|---|---|---|---|
| GB | 1387690 | A | 3/1975 |
| JP | H099760 | A | 1/1997 |

\* cited by examiner

ROTARY DUST SCREEN

This application claims priority to Belgium Application BE2015/5114 filed Mar. 4, 2015, which is incorporated herein by reference in its entirety.

FIELD OF THE INVENTION

The present invention relates to rotary dust screen for a cooling unit of an agricultural vehicle. The invention further relates to a cooling unit comprising such a rotary dust screen.

BACKGROUND OF THE INVENTION

Most agricultural vehicles rely on substantial air cooling for their engines, drives, even air conditioning systems. Since, however, these vehicles typically work in fairly dusty and dirty circumstances, it is necessary to filter the air before running it over or through the various heat exchangers the vehicle might have.

Accordingly, it is standard practice to form the air intake filter as a perforated dust screen centered on an axis and preferably shaped having an axially directed perforated end and a radially directed perforated side. The dust screen is rotated about its axis and a cleaning device is provided which covers a typically pie-shaped segment of the dust screen, so that each time the dust screen rotates it passes through the cleaner and in theory any particles on outer phases of the dust screen are removed.

U.S. Pat. No. 6,248,145 describes such rotary dust screen for a cooling unit of an agricultural vehicle. The rotary dust screen is provided with a brush assembly whose bristles engage an inner side of the cooling unit housing. Via these brushes, entrance of contaminants into the cooling unit via an edge of the rotary dust screen is prevented. The rotary dust screen is driven via a belt that engages with an outer end of the rotary dust screen, which belt is driven by a rotary actuator.

SUMMARY OF THE INVENTION

It is an object of the present invention to provide a rotary dust screen that can be more optimally built into a cooling unit in terms of design flexibility and maintenance.

To this end, the present invention provides a rotary dust screen for a cooling unit of an agricultural vehicle, the rotary dust screen comprising a frame having a wing shape, wherein a dust screen is mounted in the frame, and wherein the frame comprises a seal extending along the ring, and comprising a lip adapted to abut, when the rotary dust screen is mounted on the cooling unit, against a housing of the cooling unit to prevent contaminants from entering the cooling unit at an edge of the dust screen, wherein the rotary dust screen further comprises a driving belt adapted to be driven by a rotary actuator to rotate the dust screen, wherein the driving belt engages with the rotary dust screen at an outer surface of the seal.

The rotary dust screen of the invention comprises a ring-shaped frame. All elements of the rotary dust screen are mounted directly or indirectly against this frame. The rotary dust screen comprises the seal with the lip for abutting against a housing of the cooling unit. This seal prevents contaminants to enter the cooling unit at an edge of the rotary dust screen. The driving belt that drives the rotary dust screen engages at an outer surface of that seal. The result is that the ring-shaped frame can be designed in a very compact manner. Namely, only the seal and the dust screen are mounted directly against the frame, and the driving belt is mounted on the seal, thus indirectly against the frame. Therefore, no separate belt guiding surface should be provided at the ring-shaped frame, so that the ring-shaped frame can be designed in a very compact manner. The compact size of the ring-shaped frame has as an advantage that the rotary dust screen can be more easily built into a cooling unit, namely it takes less space. Furthermore, when more space is available in the cooling unit, the surface area of the dust screen can be made larger than conventionally since the ring-shaped frame is more compact than conventionally. Furthermore, since the driving belt is mounted at an outer side of the rotary dust screen, maintenance can be performed easily since the cooling unit must not be demounted to gain access to the driving belt or the rotary actuator driving the driving belt.

Preferably, the frame comprises an outer frame surface wherein the seal is mounted with an inner seal surface against the outer surface of the frame. As a consequence, the seal is also ring-shaped with a diameter that substantially matches the diameter of the ring-shaped frame. Such construction proves to be an efficient and compact way of mounting the seal to the ring-shaped frame.

Preferably, the seal is made of a resilient plastic material. Tests have shown that the proposed rotary dust screen wherein the driving belt engages with an outer surface of the seal operates significantly well when the seal is made of a resilient plastic material. The lip of the seal will, due to the resilience of the material of the seal, exert a predetermined pressure to the outer side of the housing, so that a good sealing is obtained. The predetermined pressure can be chosen when designing the seal with the lip. Furthermore, the friction coefficient between the driving belt and the resilient plastic material is high due to the nature of the resilient plastic material, so that the driving belt only needs to engage over a limited angle of the rotary dust screen, as will be clear from the examples given in the detailed description. This gives designers of cooling units a significant benefit and design freedom.

Preferably, the seal comprises a groove at an outer seal surface, which groove is adapted for engagement with the driving belt. Thereby, preferably, the driving belt is a V-shaped belt to engage in the groove of the seal. A V-shaped belt with a predetermined width can transfer a significantly higher force than a flat belt with the same predetermined width. Therefore, providing a groove at the seal, and forming the driving belt as a V-shaped belt allows building the rotary dust screen in a more compact manner.

Preferably, the frame comprises a protrusion extending on an inner side of the ring-shaped frame, which protrusion is adapted to engage with positioning elements at the cooling unit. The cooling unit can for example by provided with guiding wheels that hold the rotary dust screen in position. These guiding wheels can grip the frame at the protrusion so that the position of the rotary dust screen is determined with respect to the cooling unit. Since the rotary dust screen can be positioned in the cooling unit via its frame, no central axis must be provided to the rotary dust screen, and the complete outer surface of the rotary dust screen is useable as dust filter. However a central axis may be provided for other purposes, for example for supporting the cleaning element. By not providing a central axis, the dust screen surface area can be more optimally used.

Preferably, the dust screen is mounted at an inner segment of the frame. This in combination with the seal being mounted against an outer surface of the frame allows the frame to have a highly compact shape.

Preferably, the dust screen is formed by a metal perforated plate. Metal perforated plates have shown to perform well in the extremely dusty conditions wherein agricultural vehicles operate.

Preferably, the dust screen provides a cylindrical part and comprises a closing part, wherein one end of the cylindrical part is connected to the frame, while another end of the cylindrical part is closed by the closing part. In this manner, the outer surface of the rotary dust screen is significantly increased compared to the surface area inside the ring-shaped frame, due to the cylindrical part of the dust screen. Particularly since the ring-shaped frame of the rotary dust screen of the invention is compact, the cylindrical part can be made larger to compensate for the more compact shape of the frame, so that a larger dust screen surface area is obtained.

Preferably, a dust cleaning module is provided which is adapted to be mounted to the housing of the cooling unit to cover a segment of the rotary dust screen that extends between an area at the frame and an area at the center of the rotary dust screen. Because the dust cleaning module, which is typically formed as a suction element, extends between an area at the frame and an area at the center of the dust screen, rotating the dust screen will have as an effect that substantially the complete dust screen passes by the dust cleaning module. In this manner, the dust screen can be kept clean by rotating the rotary dust screen.

The present invention further relates to a cooling unit with a housing and a rotary dust screen of the invention, wherein the cooling unit comprises a rotary actuator at an outer side of the housing, which rotary actuator engages with the driving belt to rotate the dust screen. Preferably, the cooling unit comprises multiple rotary dust screens of the invention and the multiple dust screens are driven by a single driving belt that engages with each of the outer surfaces of the seals of the multiple dust screens. Since the cooling unit can be provided with multiple rotary dust screens, which is cost efficient with the rotary dust screen of the invention, because the ring shaped frame of the rotary dust screen is compact, more design possibilities are available for designing a cooling unit. These multiple rotary dust screens can then be driven by a single driving belt which is driven by a rotary actuator at an outer side of the housing. Thereby, a compact and maintenance efficient cooling unit can be obtained.

The present invention further relates to an agricultural vehicle with a cooling unit of the invention.

BRIEF DESCRIPTION OF THE DRAWINGS

The invention will now be described in more details with respect to the drawings illustrating some preferred embodiments of the invention. In the drawings.

DETAILED DESCRIPTION OF PREFERRED EMBODIMENTS

Figure 1:
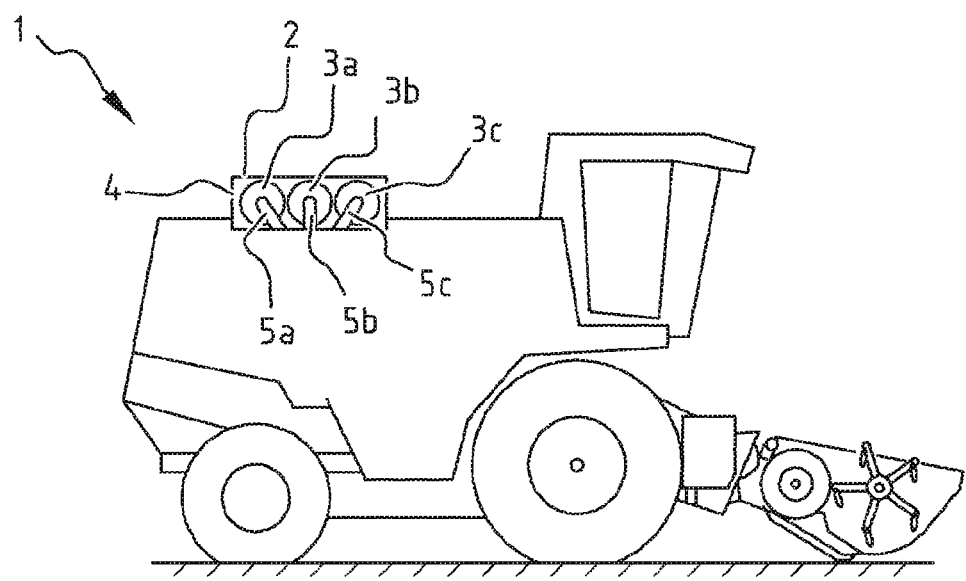
FIG. 1 illustrates an agricultural vehicle with a cooling unit according to an embodiment of the invention.

In the drawings a same reference number has been allocated to a same or analogous element.

FIG. 1 shows an agricultural vehicle 1 with a cooling unit 2. The shown agricultural vehicle 1 is an agricultural combine, however, it will be clear that the cooling unit 2 according to the invention is suitable for various agricultural vehicles, preferably self-propelled agricultural vehicles. Self-propelled agricultural vehicles typically require a significant cooling capacity. To achieve such cooling capacity in dusty environments, the cooling unit of the present invention can be used.

Cooling unit 2 is adapted for drawing air from an environment of the agricultural vehicle into the cooling unit where it is typically guided over one or multiple heat exchangers and/or over other elements that require cooling. The present invention particularly relates to the part of the cooling unit 2, where the environmental air enters the cooling unit 2.

Since agricultural vehicles typically operate in dusty environments, the openings of the cooling unit 2 are provided with respective rotary dust screens 3. The rotary dust screen 3 is mounted in an opening of a housing 4 of the cooling unit 2 to cover the opening. The rotary dust screen 3 is provided with perforations so that air can flow through the rotary dust screen 3 into the cooling unit 2. Thereby, the perforations have predetermined dimensions which are chosen to prevent dust particles from entering the cooling unit 2. In this manner, the rotary dust screen 3 operates as a filter for filtering environmental air that is drawn into the cooling unit 2.

To prevent the rotary dust screen 3 from getting clogged up with dust particles, a cleaning element 5 is provided, which is typically pie-shaped and extends over a part of the rotary dust screen 3 between an area at the edge or frame of the rotary dust screen 3 and a central area of the rotary dust screen 3. The cleaning element is preferably formed as a suction element that operates as a vacuum cleaner for cleaning the outer surface of the rotary dust screen. The cleaning element 5 is preferably mounted in a fixed position, and the dust screen 3 is rotated so that by rotation of the dust screen 3 substantially the complete rotary dust screen 3 passes by the cleaning element 5. In this manner the outer surface of the rotary dust screen is suction cleaned every time the rotary dust screen makes a full rotation, so that the rotary dust screen is prevented from getting clogged up with dust particles.

In the example of FIG. 1 three rotary dust screens 3*a*, 3*b*, 3*c* are provided to cover three corresponding openings in a housing 4 of the cooling unit 2. Each of the rotary dust screens 3*a*, 3*b*, 3*c* is provided with a suction cleaning element 5*a*, 5*b*, 5*c*. It will be clear that the cooling unit 2 can also be designed with different numbers of rotary dust screens 3 and corresponding suction cleaners 5. Therefore, the invention is not limited to a cooling unit 2 having three rotary dust screens 3*a*, 3*b*, 3*c*.

Figure 2:
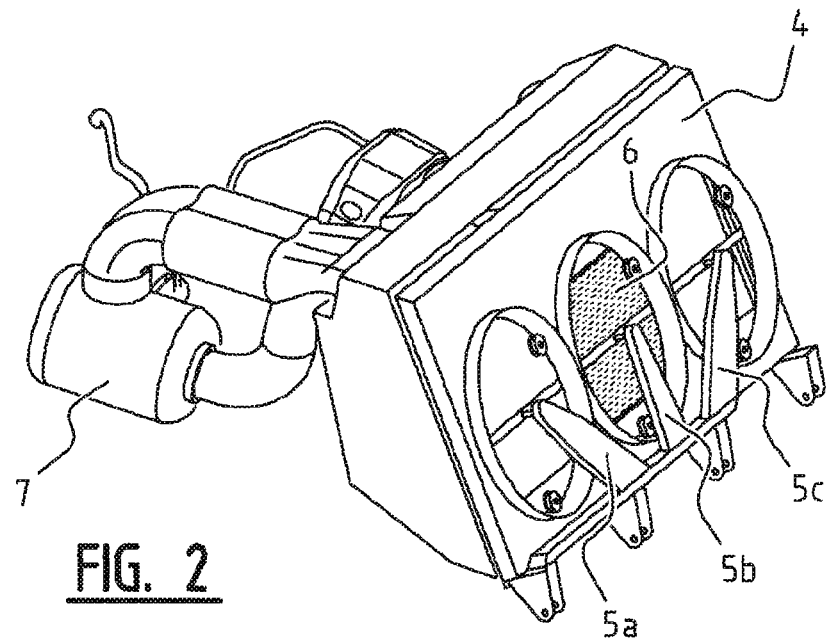
FIG. 2 illustrates a cooling unit according to an embodiment of the invention.

FIG. 2 shows a cooling unit 2 according to an embodiment of the invention. Thereby, FIG. 2 shows the housing 4 of the cooling unit, and shows the openings in which rotary dust screens are mounted. For clarity, and for showing inner parts of the cooling unit 2, the dust screens are not shown in FIG. 2. FIG. 2 shows the heat exchangers 6 that are mounted inside the cooling unit 2. FIG. 2 further shows the suction device 7 that is operationally connected to the suction elements 5a, 5b and 5c for cleaning the outer surface of the rotary dust screens.

Figure 3A:
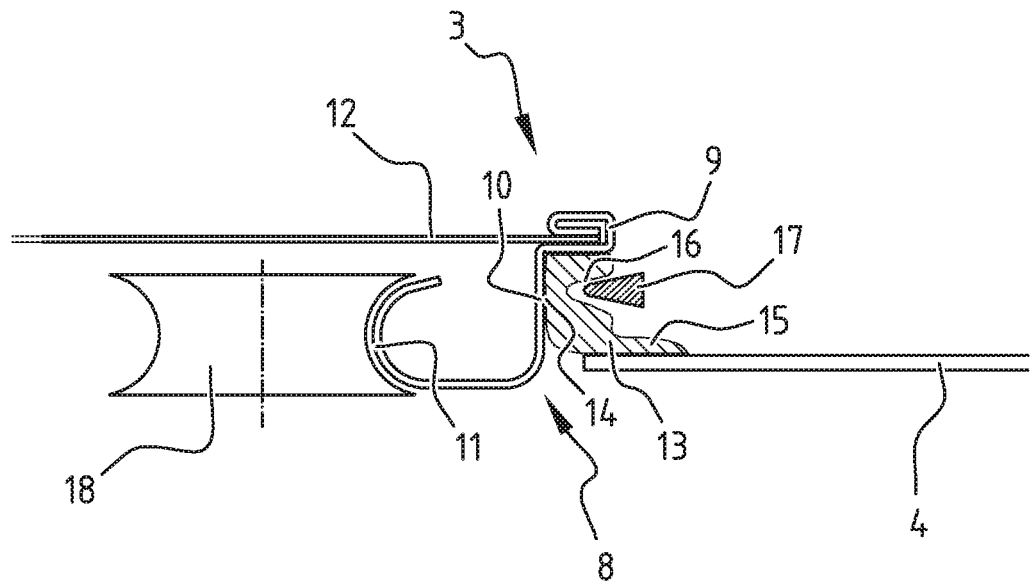
FIG. 3A shows a first embodiment of a cross section of a rotary dust screen mounted in a cooling unit housing according to an embodiment of the invention.
Figure 3B:
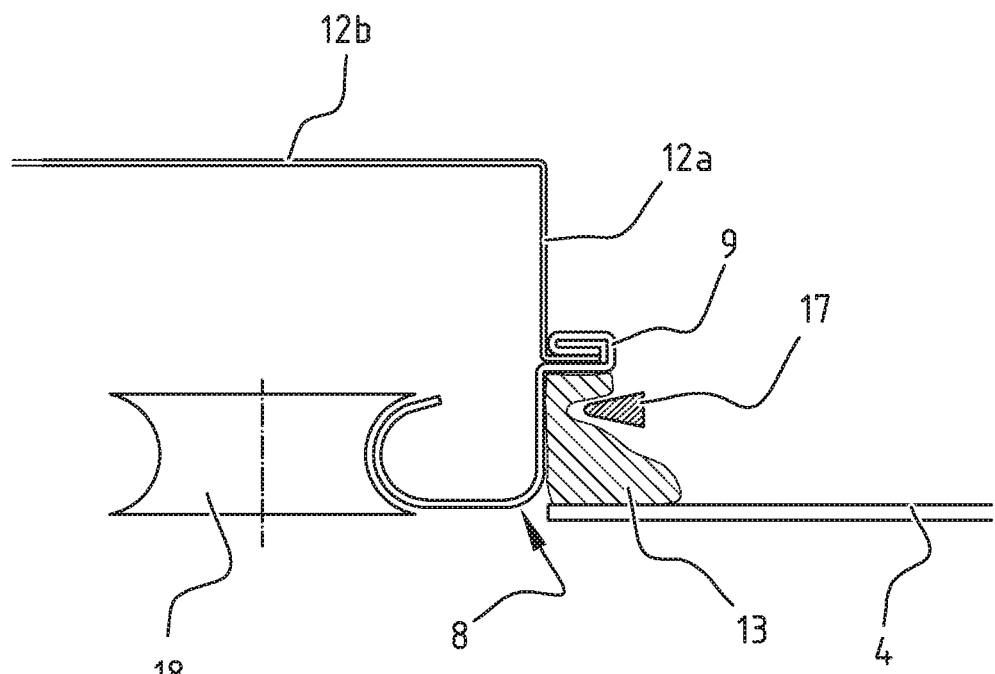
FIG. 3B shows a second embodiment of a cross section of a rotary dust screen mounted in a cooling unit housing according to an embodiment of the invention; and shows a cross section of a rotary dust screen mounted in a cooling unit housing according to an embodiment of the invention.

FIGS. 3A and 3B shows a cross section of an edge of a rotary dust screen according to a first and a second embodiment of the present invention. In the first embodiment, shown in FIG. 3a, the rotary dust screen is substantially flat, meaning that the dust screen 12 is not provided with a cylindrical part. In the second embodiment shown in FIG. 3b, the dust screen has a cylindrical part 12a and a closing part 12b, which allows to significantly increase the surface area of the dust screen. Thereby one end of the cylindrical part 12a is closed with the closing part 12b while the other end is mounted in the frame, which is described hereunder. The techniques for mounting the dust screen, for sealing the edges of the dust screen with respect to the housing 4 of the cooling unit and for driving the rotary dust screen are substantially the same for the first and second embodiment, as is described hereunder.

The rotary dust screen comprises at least four main elements being a frame 8, a dust screen 12, a seal 13 and a driving belt 17. These elements of the rotary dust screen 3 cooperate with the housing 4 of the cooling unit, and optionally with positioning elements 18 that are connected to the housing 4 in order to filter the air entering the cooling unit 2. In this context it is noted that the connection between the positioning element 18 and the housing 4 is not shown in FIGS. 3A and 3B.

The frame 8, of which a cross section is shown in FIG. 3a, is ring-shaped with a diameter that corresponds with the diameter of the opening in the housing 4 of the cooling unit 2. The ring-shaped frame 8 comprises a first part 9 for connection of the dust screen 12. This first part 9 is preferably formed with a U-shaped cross section that allows to clamp the dust screen 12 between the legs of the U-shape. This allows to mount the dust screen in the ring-shaped frame 8 in a convenient manner. The U-shape can, after positioning of the dust screen, be deformed to bring the legs of the U-shape together to thereby clamp the dust screen 12 in the frame 8. In this manner, the frame 8 is rigidly connected to the dust screen 12. The skilled person will understand that other ways of connecting the dust screen 12 to the ring-shaped frame 8 are also possible, for example by gluing or welding.

The frame 8 further comprises a second part with an outer surface 10 that is adapted for receiving a seal 13. The outer surface 10 allows the seal 13 to be stretched and clamped around the ring-shaped frame 8 so that the seal 13 is mounted against the frame 8 along the entire outer surface 10.

Frame 8 further preferably comprises a third part being a protrusion 11 that extends to an inner side of the ring-shaped frame. This protrusion 11 is in the example of FIG. 3a formed as a partly tube-shaped protrusion. The protrusion 11 facilitates engagement of positioning elements 18 with the rotary dust screen 3. The rotary dust screen 3 can then via the protrusion 11 be held in place by the positioning elements 18.

The seal 13 is ring-shaped with a diameter that matches the diameter of the ring-shaped frame 8 so that the seal 13 can be stretched and clamped around the ring-shaped frame 8 to obtain a rigid connection between the seal 13 and the frame 8. Thereby it will be clear that in the shown example the rigid connection is solely obtained by friction between the frame 8 and the seal 13, particularly between the outer surface 10 of the frame 8 and the inner surface 14 of the seal.

Other ways of connecting the seal to the frame are also possible. The seal 13 comprises a lip 15 that is adapted to abut against the housing 4 of the cooling unit 2, when the rotary dust screen is mounted onto the cooling unit 2. Preferably, the seal 13 abuts against a protrusion of the frame 8 at one end of the seal, in the example of FIGS. 3A and 3B the protrusion is the first part 9, while the lip 15 is formed at the other end of the seal 13. In this manner, when the frame 8 is correctly positioned with respect to the opening in the housing 4, the lip 15 will always push against the housing 4 thereby obtaining a reliable and tight sealing between the edge of the rotary dust screen 3 and the housing 4. In the shown example, when the rotary dust screen is mounted to the cooling unit, the seal is trapped between on the one hand the first part 9 of the frame, extending outward from the outer surface, and on the other hand the housing 4. This sealing prevents contaminants from entering the cooling unit 2 via the edge of the rotary dust screen 3.

The seal 13 comprises a V-shaped groove 16 at an outer surface of the seal 13. The outer surface of the seal 13 is a surface opposite to the inner side 14 of the seal 13. The groove 16 is preferably V-shaped, and is preferably optimized for cooperating with a V-shaped driving belt 17. Via this driving belt 17, the rotary dust screen 3 can be driven. The seal 13 is preferably made from a resilient material, more preferably a resilient plastic material. The resilient material can for example be rubber or a synthetic rubber. Resilient materials are known for having a high friction coefficient, so that mounting the seal 13 onto the frame 8 will result in a rigid connection, and so that engagement with the driving belt 17 will result in a high friction between the driving belt 17 and the seal 13. The advantage of this high friction is explained hereunder in relation to FIG. 4.

Figure 4:
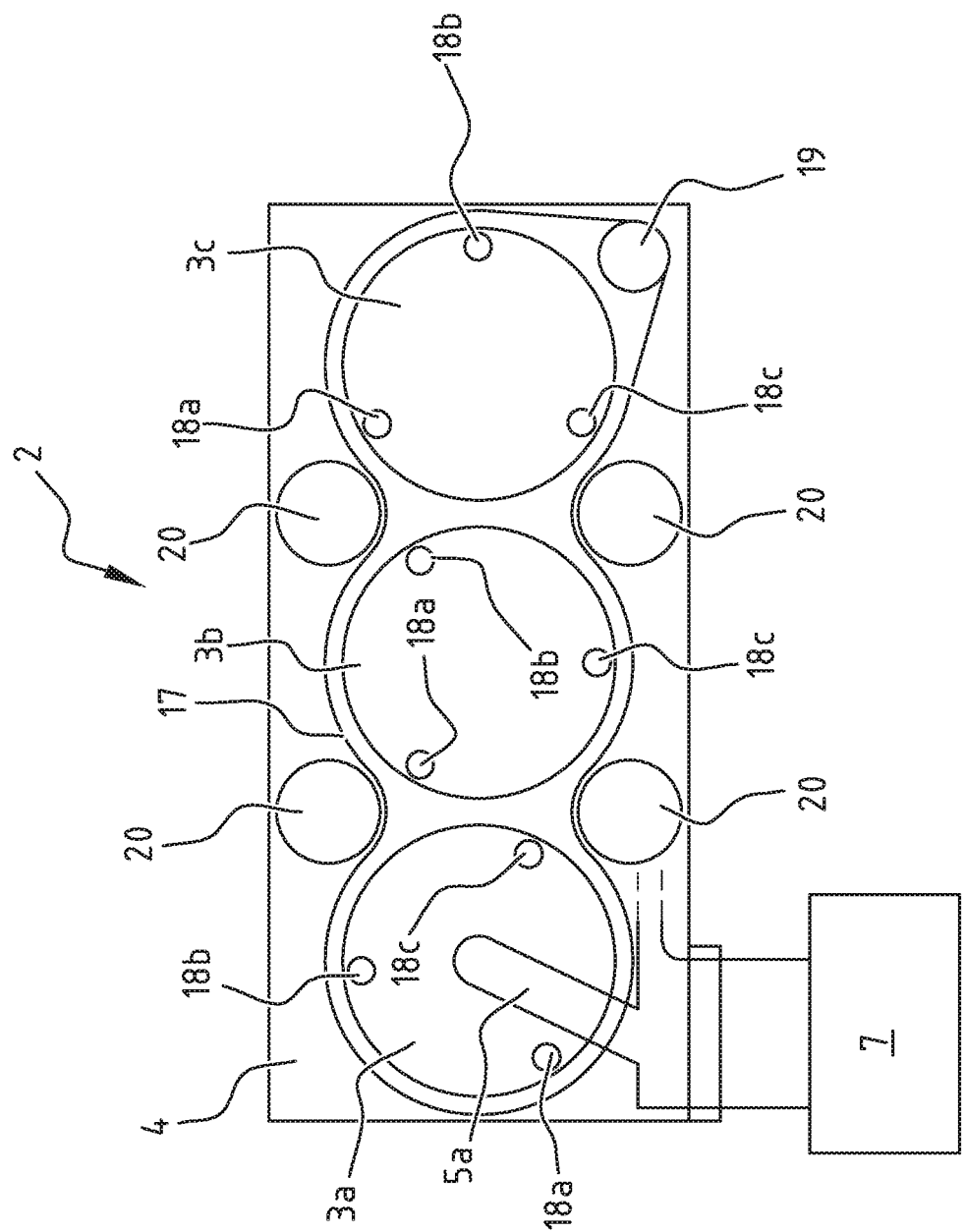
FIG. 4 illustrates a top view of a cooling unit according to an embodiment of the invention.

FIG. 4 shows a schematical top view of a cooling unit 2 provided with three rotary dust screen 3a, 3b, 3c. For clarity purposes, only a single cleaning unit 5a is shown, however, it will be clear that rotary dust screen 3b and rotary dust screen 3c are also provided with a cleaning unit 5. The figure shows how each rotary dust screen 3a, 3b, 3c is held in place via three positioning elements 18a, 18b, 18c. These positioning elements 18 can for example be formed by wheels as shown in FIGS. 3A and 3B, which cooperate with the protrusion 11 of the frame 8 to hold the rotary dust screens 3a, 3b, 3c in position with respect to the housing 4 of the cooling unit 2.

FIG. 4 shows how the three rotary dust screen 3a, 3b and 3c are driven by a single driving belt 17. The driving belt 17 is driven by a rotary actuator 19 which is mounted at an outer side of the housing 4 of the cooling unit 2. Since the rotary actuator 19 is mounted at an outer side, as well as the driving belt 17 is mounted at an outer side, maintenance of these elements is easy to perform. Driving belt guiding wheels 20 are provided to guide the driving belt in a predetermined path around the multiple rotary dust screens. These guiding wheels 20 can be further provided with tensioning elements (not shown) to provide a predetermined tension to the driving belt 17. FIG. 4 shows how the driving belt 17 engages with the middle rotary dust screen 3b only over a limited angular segment of the outer surface of the rotary dust screen. However, since the friction between the seal 13 and the driving belt 17 is high, tests have shown that this limited engagement area is sufficient for the driving belt 17 to be able to drive the middle rotary dust screen 3b.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. Rotary dust screen assembly for a cooling unit of a vehicle, the rotary dust screen comprising:
    a frame having a ring shape, wherein a dust screen is mounted in the frame and wherein the frame comprises a seal extending around the outer surface of the ring and comprising a lip adapted to abut, when the rotary dust screen is mounted on the cooling unit, against a housing of the cooling unit to prevent contaminants from entering the cooling unit at an edge of the dust screen,
    a driving belt adapted to be driven by a rotary actuator to rotate the dust screen, wherein the driving belt is engaged at an outer surface of the seal to rotate the dust screen through the seal.

2. The rotary dust screen assembly according to claim 1, wherein the frame comprises an outer frame surface and wherein the seal is mounted with an inner seal surface against the outer frame surface.

3. The rotary dust screen assembly according to claim 1, wherein the seal is made of a resilient plastic material.

4. The rotary dust screen assembly according to claim 1, wherein the seal comprises a groove at the outer surface of the seal, and the groove is adapted for engagement with the driving belt.

5. The rotary dust screen assembly according to claim 4, wherein the driving belt is a V-shaped belt adapted to engage in the groove of the seal.

6. The rotary dust screen assembly according to claim 1, wherein the frame comprises a protrusion extending to an inner side of the ring-shaped frame and the protrusion is adapted to engage with positioning elements at the cooling unit.

7. The rotary dust screen assembly according to claim 1, wherein the dust screen is mounted at a first segment of the frame.

8. The rotary dust screen assembly according to claim 1, wherein the dust screen is formed by a perforated metal plate.

9. The rotary dust screen assembly according to claim 1, wherein the dust screen comprises a cylindrical part and a closing part, wherein one end of the cylindrical part is connected to the frame and another end of the cylindrical part is closed by the closing part.

10. The rotary dust screen assembly according to claim 1, further comprising a dust cleaning module adapted to be mounted to the housing of the cooling unit to cover a segment of the rotary dust screen that extends between an area at the frame and an area at the center of the rotary dust screen.

11. A Cooling unit comprising
    a housing and
    at least one rotary dust screen assembly comprising
        a frame having a ring shape, wherein a dust screen is mounted in the frame and wherein the frame comprises a seal extending around the outer surface of the ring and comprising a lip adapted to abut, when the rotary dust screen is mounted on the cooling unit, against a housing of the cooling unit to prevent contaminants from entering the cooling unit at an edge of the dust screen,
    a driving belt adapted to be driven by a rotary actuator to rotate the dust screen, wherein the driving belt is engaged at an outer surface of the seal to rotate the dust screen through the seal
    a rotary actuator, which rotary actuator engages with the driving belt for rotating the dust screen.

12. Cooling unit according to claim 11, wherein the at least one rotary dust screen assembly comprises multiple rotary dust assemblies, and wherein the multiple rotary dust assemblies are driven by a single driving belt that engages with each of the outer surfaces of the seals of the multiple rotary dust assemblies.

13. The cooling unit of claim 11 in combination with an agricultural vehicle wherein the cooling unit forms part of a cooling system of the agricultural vehicle.

* * * * *